United States Patent [19]

Sheriff

[11] Patent Number: 4,973,444
[45] Date of Patent: Nov. 27, 1990

[54] NUCLEAR REACTOR INSTALLATIONS

[75] Inventor: Norman Sheriff, Altrincham, United Kingdom

[73] Assignee: United Kingdom Atomic Energy Authority, London, England

[21] Appl. No.: 154,009

[22] Filed: Feb. 9, 1988

[30] Foreign Application Priority Data

Mar. 2, 1987 [GB] United Kingdom ............... 8704872

[51] Int. Cl.$^5$ .................. G21C 11/08; G21C 15/00
[52] U.S. Cl. ............................ 376/399; 165/135; 376/290; 376/403
[58] Field of Search .................. 376/403–405, 376/399, 290, 291, 454; 165/135, 904

[56] References Cited

U.S. PATENT DOCUMENTS

| 2,961,393 | 11/1960 | Monson ............................ 376/404 |
| 3,764,468 | 10/1973 | Hind ................................ 376/290 |
| 3,930,941 | 1/1976  | Meerwald et al. . |
| 3,932,214 | 1/1976  | Aubert et al. ..................... 376/405 |
| 4,043,866 | 8/1977  | Durston ........................... 376/405 |
| 4,043,867 | 8/1977  | Benque et al. ................... 376/404 |
| 4,046,629 | 9/1977  | Durston et al. .................. 376/290 |
| 4,154,651 | 3/1979  | Kenworthy et al. ............. 376/290 |
| 4,259,155 | 3/1981  | Peehs et al. . |
| 4,303,474 | 12/1981 | Baxi ................................ 376/399 |
| 4,366,854 | 1/1983  | Artaud et al. ................... 376/405 |
| 4,664,876 | 5/1987  | Uotani et al. .................... 376/290 |
| 4,759,898 | 7/1988  | Lemerciev ....................... 376/290 |
| 4,761,261 | 8/1988  | Garabedian ..................... 376/404 |

FOREIGN PATENT DOCUMENTS

| 115481  | 7/1942  | Australia ......................... 165/904 |
| 2804560 | 8/1978  | Fed. Rep. of Germany ...... 376/290 |
| 2260743 | 9/1975  | France ............................. 376/290 |
| 2379882 | 9/1978  | France . |
| 2532629 | 3/1984  | France . |
| 0145897 | 11/1979 | Japan .............................. 376/290 |
| 0060391 | 4/1984  | Japan .............................. 376/290 |
| 0090080 | 5/1984  | Japan .............................. 376/290 |
| 0233595 | 11/1985 | Japan .............................. 376/290 |
| 387828  | 2/1933  | United Kingdom ............. 165/904 |
| 1546331 | 5/1979  | United Kingdom . |

Primary Examiner—Harvey E. Behrend
Attorney, Agent, or Firm—William R. Hinds

[57] ABSTRACT

In a liquid metal cooled fast neutron nuclear reactor plant, surfaces (12) which are immersed in the flowing liquid metal and are vulnerable to liquid metal temperature fluctuations are provided with fins (20) defining cavities (22) for at least temporarily trapping the liquid metal to produce a thin layer of the liquid metal on the surface and thereby attenuate the effect of temperatures fluctuations occurring in the liquid metal flow.

3 Claims, 3 Drawing Sheets

↑A

↑A

NUCLEAR REACTOR INSTALLATIONS

FIELD OF THE INVENTION

This invention relates to liquid metal cooled fast neutron nuclear reactor plant.

BACKGROUND OF THE INVENTION

In such reactors, thermal striping conditions, consisting of rapid temperature fluctuations of significant amplitudes, may occur in the liquid metal flow and this can give rise to difficulties if such temperature fields arise in close proximity to component structures.

More specifically, in a liquid metal-cooled fast breeder nuclear reactor, the fuel assembly comprises a multiplicity of slender fuel elements or pins over which liquid metal coolant such as sodium flows. The fuel assembly is divided into a plurality of sub-assemblies, each comprising a plurality of fuel pins enclosed by a tubular wrapper and having a lifting head. The sub-assemblies are positioned in side-by-side array and each one is located in cantilever manner by a lower and spike which is plugged into a fuel assembly supporting structure. The sub-assemblies in the central region of the fuel assembly mainly comprise fissile material whilst the sub-assemblies in the surrounding outer region comprise breeder material. During operation of the nuclear reactor the fertile material captures neutrons emitted by fission in the fissile material to produce further fissile material. As irradiation of the fuel assembly progresses and the fissile content of the breeder material increases, fission of some of the newly formed fissile material takes place so that the power output of the breeder sub-assemblies and, therefore, the coolant temperature, progressively increases. Varying temperatures of coolant streams flowing from the fuel assembly give rise to the condition known in the fast reactor art as thermal striping, a condition describing the production of rapid temperature fluctuations which can give rise to a risk of cracking in reactor structure material.

FEATURES AND ASPECTS OF THE INVENTION

According to the present invention there is provided liquid metal cooled fast neutron nuclear reactor plant comprising a vessel containing flowing liquid metal and at least one component or structure having a surface which is immersed in the liquid metal and is vulnerable to flowing liquid metal temperature fluctuations, characterised in that said surface is provided with means for trapping, at least temporarily, a thin layer of liquid metal at said surface to insulate said surface from direct exposure to said temperature fluctuations.

In practice, surfaces which, during operation of the reactor, are immersed in the liquid metal and are exposed to rapid temperature fluctuations of several tens of degrees Centigrade or greater will be provided with liquid metal-trapping cavities to afford some measure of attenuation.

The invention is particularly applicable to surfaces of components and structures disposed within the reactor primary vessel adjacent the upper, outlet ends of the fuel sub-assemblies forming the reactor core. In one reactor design, structures and components which are particularly vulnerable are the peripheral shroud tubes of the above-core structure, the instrument rotor and the charge machine.

The liquid metal trapping means conveniently comprises a cavity or cavities which may be formed by a number of fins projecting from the surface so as to define between each pair of fins a cavity which is exposed to the liqiud metal flow and can thereby admit a quantity of the liquid metal (usually sodium) to produce a substantially stagnant volume of liquid metal or at least retain the liquid metal for a sufficient residence time to act as a thermal insulation layer.

In contrast with conventional heat transfer techniques in which to promote more efficient heat transfer between a flowing gaseous fluid medium and surfaces, fins are provided on the surfaces to disrupt boundary layer formation, the invention utilises fins to attenuate heat transfer between the liquid metal and the surfaces. Such attenuation is obtained because the fluid in this instance is a liquid metal such as sodium which tends to form a thicker boundary layer than a gaseous medium and is less susceptible to disruption.

Typically, the fins may range from 3 to 5 mm in height and the inter fin spacing may be 3 to 5 mm. The fin thickness may be of the order of 1 mm.

SUMMARY OF THE INVENTION

In accordance with the present invention, in a fast neutron nuclear reactor plant having a reactor core including fuel subassemblies and having above-core structure, there is provided an improvement for reducing temperature fluctuations at a surface of the above-core structure immersed in and exposed to free flowing liquid metal coolant in the region of outlets of the reactor fuel subassemblies. The improvement comprises the provision on the surface of fins projecting with their tips clear of other surfaces into the free flowing liquid metal coolant in the region of outlets of the reactor fuel subassemblies to define cavities between neighboring fins in which cavities the motion of the coolant is less than beyond the tips such that the residence time of the coolant therein enables it to act as a thermal insulation layer for the surface, the surface of the above-core structure being on at least one of the group consisting of peripheral shroud tubes, a charge machine and an instrumentation rotor, the fins having a height and fin to fin spacing of about 3–5 mm.

BRIEF DESCRIPTION OF THE DRAWINGS

A liquid metal cooled fast breeder reactor embodying the invention will now be described by way of example only with reference to the accompanying drawings in which.

DESCRIPTION OF THE PREFERRED EMBODIMENTS

Figure 1:
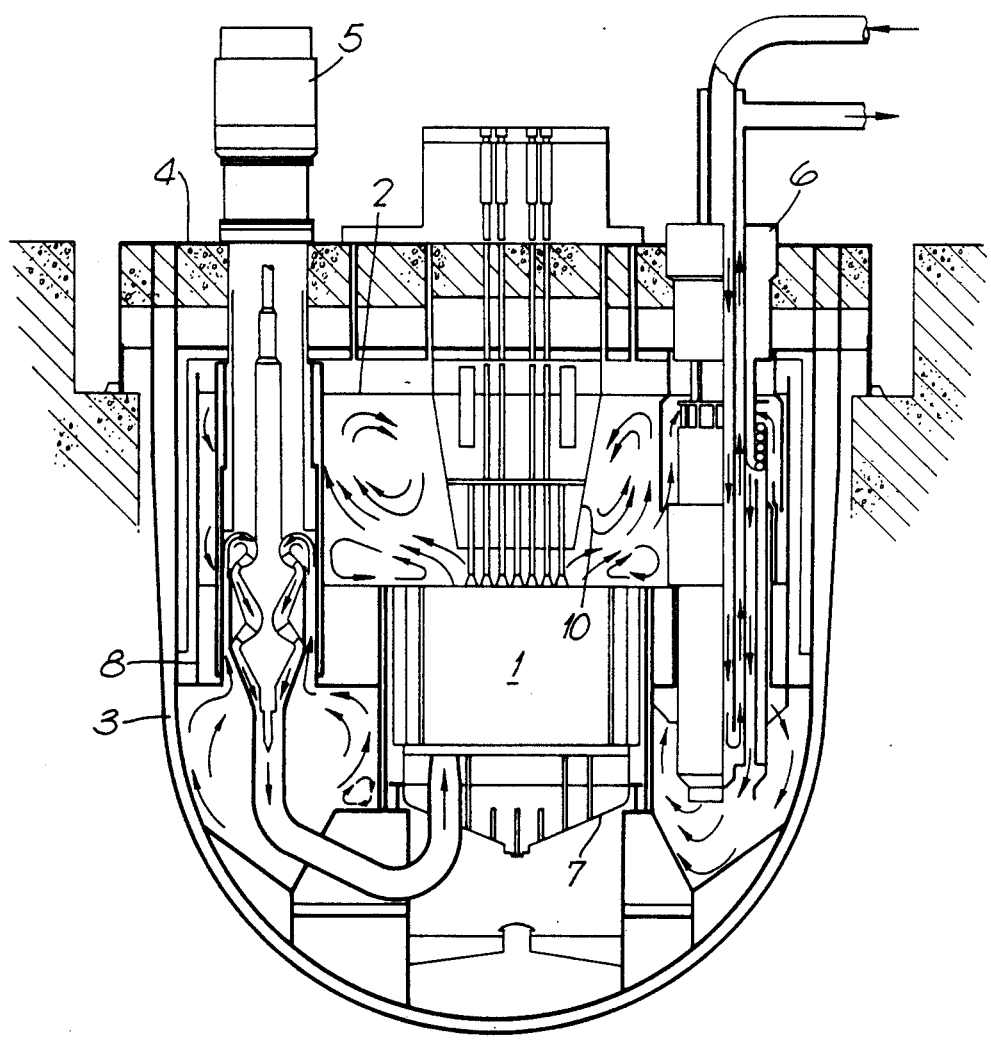
FIG. 1 is a cross-sectional view of the reactor.

FIG. 1 illustrates a liquid metal cooled fast breeder nuclear reactor having a fuel assembly or core 1 submerged in a pool 2 of liquid sodium coolant in a primary vessel 3. The primary vessel is suspended from the roof 4 of a containment vault and there is provided a plurality of coolant pumps 5 and heat exchangers 6 only one of each pump and heat exchanger being shown. The fuel assembly 1 mounted on a structure 7 is housed with the heat exchangers in a core tank 8. The core or fuel assembly 1 comprises a plurality of sub-assemblies 9 (shown in part in FIG. 2) which upstand from the support structure 7 in a closely spaced side-by-side array and discharge the liquid sodium coolant upwardly. An above-core structure 10 incorporating control rods and instrumentation 11 (see FIGS. 1 and 2) penetrate the roof of the vault. The fuel assembly 1 comprises a central region having sub-assemblies 9A containing fissile or driver material and an outer annular region having sub-assemblies 9B containing fertile or breeder material.

Figure 2:
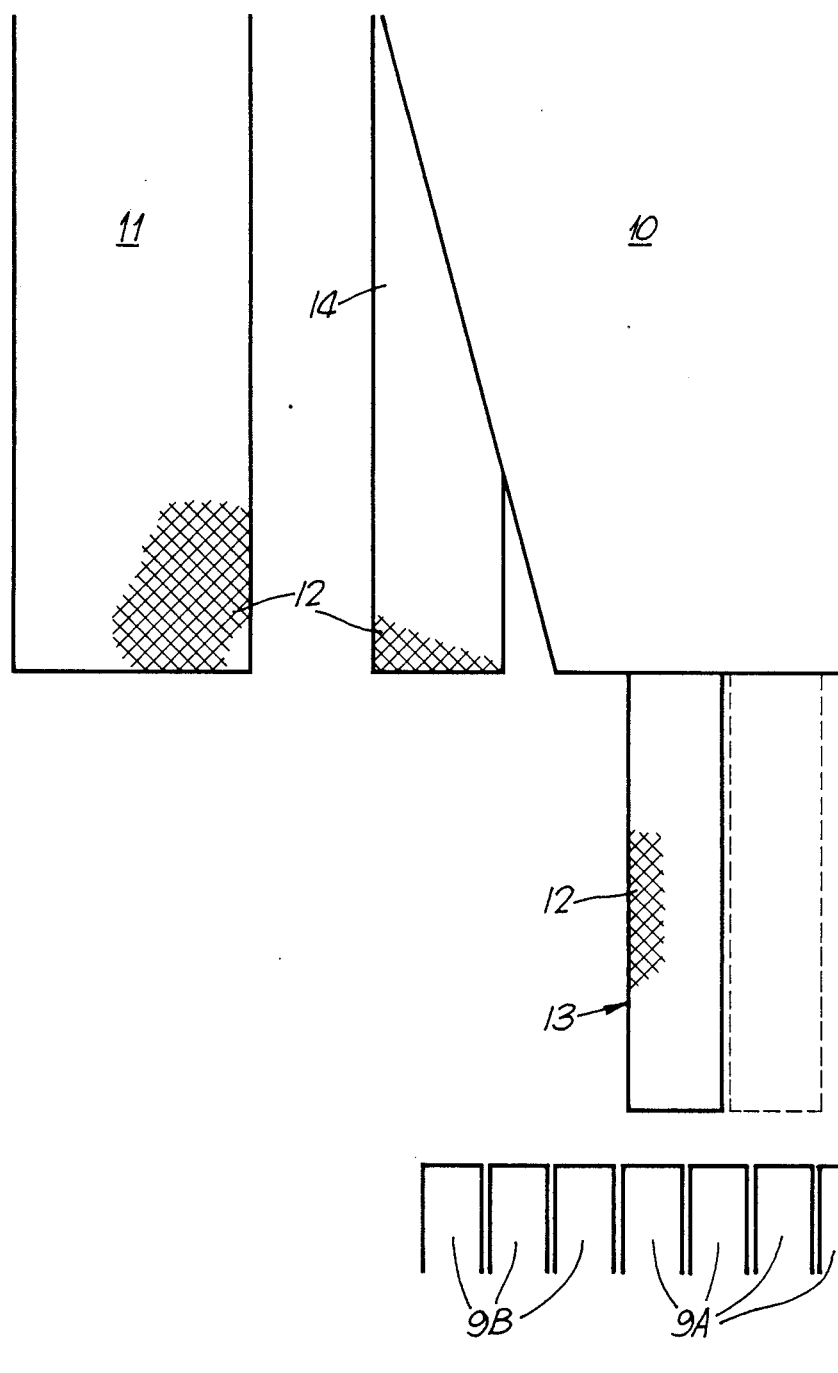
FIG. 2 is a diagrammatic fragmentary view of part of the reactor.

FIG. 2 illustrates a number of zones 12 (shown cross-hatched) which are under sodium and are particularly vulnerable to thermal striping effects, these zones 12 being on the peripheral shroud tubes 13 of the above-core structure 10, the charge machine 14 and instrumentation rotor 11.

Figure 3:
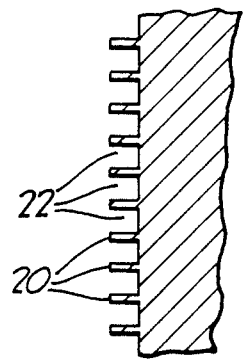
FIGS. 3 and 4 illustrate the application of finning to surfaces of components and structure within the reactor.

In accordance with the invention the surfaces are provided with a series of generally parallel fins which serve to trap a layer of relatively stagnant liquid metal coolant in the spaces between the fins. Thus, as shown in FIG. 3, where the coolant flow (see arrow A) is generally parallel to the vulnerable surface, the latter is provided with a series of generally parallel fins 20 substantially perpendicular to the surface and also the coolant flow and forming cavities 22 into which the coolant enters at least for a certain residence time thereby forming a thin layer of coolant across the surface to attenuate the effects of thermal striping.

Figure 4:
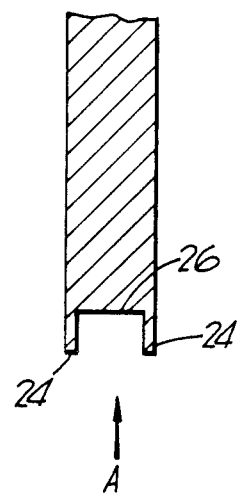

FIG. 4 illustrates application of the invention to surfaces presented by leading edges of structures or components, i.e. upon which the coolant flow impinges directly. In this instance, the leading edge is provided with fins 24 to define a cavity 26 serving to trap part of the coolant and thereby create a substantially stagnant layer of coolant.

Although the invention has application to components within the reactor primary vessel, it is also applicable to other components of the reactor plant such as heat exchangers.

I claim:

1. In a fast neutron nuclear reactor plant having a reactor core including fuel subassemblies and having above-core structure, an improvement for reducing temperature fluctuations at a surface of said above-core structure immersed in and exposed to free flowing liquid metal coolant in the region of outlets of said reactor fuel subassemblies, said improvement comprising the provision on said surface of fins projecting with their tips clear of other surfaces into the free flowing liquid metal coolant in the region of outlets of said reactor fuel subassemblies to define cavities between neighboring fins in which cavities the motion of the coolant is less than beyond the tips such that the residence time of the coolant therein enables it to act as a thermal insulation layer for said surface, said surface of the above-core structure being on at least one of the group consisting of peripheral shroud tubes, a charge machine and an instrumentation rotor, said fins having a height and fin to fin spacing of about 3-5 mm.

2. Apparatus as claimed in claim 1 in which the fins extend generally parallel to one another and project perpendicularly from the surface.

3. Apparatus as claimed in claim 1 in which the fins are about 1 mm thick.

* * * * *